June 5, 1962 S. POLLACK 3,038,039

HOLDER ATTACHMENT FOR WALL TELEPHONE BOX

Filed Dec. 16, 1958

INVENTOR.
SOLOMON POLLACK

BY Howard T. Jeandron

ATTORNEY

United States Patent Office 3,038,039
Patented June 5, 1962

3,038,039

HOLDER ATTACHMENT FOR WALL TELEPHONE BOX

Solomon Pollack, Newark, N.J., assignor to Eureka Products Corporation, Newark, N.J.
Filed Dec. 16, 1958, Ser. No. 780,751
4 Claims. (Cl. 179—146)

This invention relates to a hand set supporting attachment for supporting the phone portion of a wall telephone, when the phone is removed from its normal switch hook and it is desirable to hold the line. This invention also relates to the use of this supporting attachment for the phone as a means of retaining a paper pad or pads adjacent the phone for jotting down numbers or information, as desired.

In the use of a telephone, and particularly a wall telephone, the phone portion is normally supported by phone retaining Y-shaped pivotally mounted switch, which protrudes from one side of the telephone box. When a wall telephone is used, whether calling or being called, it is normal to remove the phone from its Y-shaped supporting switch, and in the course of a conversation, a user may wish to hold the party on the line and leave the phone for an instant or longer. On such occasion, there is no support for the phone, as returning the phone to the Y-shaped hook will break the circuit and the line cannot be held; therefore, the phone must be left dangling from its cord, which may be detrimental to both the cord and phone; that is, the cord may be in time pulled loose from the phone, or the phone itself may be dropped into contact with something below the telephone box.

To avoid this situation, it is an object of this invention to provide a supporting attachment for the phone which may be easily hooked to the bottom of the telephone box to support the phone whenever it is necessary to hold the line.

A further object of this invention is to provide a supporting attachment that is easily attached to the bottom of a wall telephone box, and in which the attachment provides support for a phone and a paper pad for jotting down phone numbers.

A still further object of this invention is to provide a supporting attachment that hangs from the bottom of a wall telephone box and abuts with the wall on which the box is mounted and in which the attachment provides support for a phone and a pad of paper for jotting down phone numbers.

Further objects of this invention may be apparent by reference to the accompanying detailed description and the drawings, in which.

Figure 1:
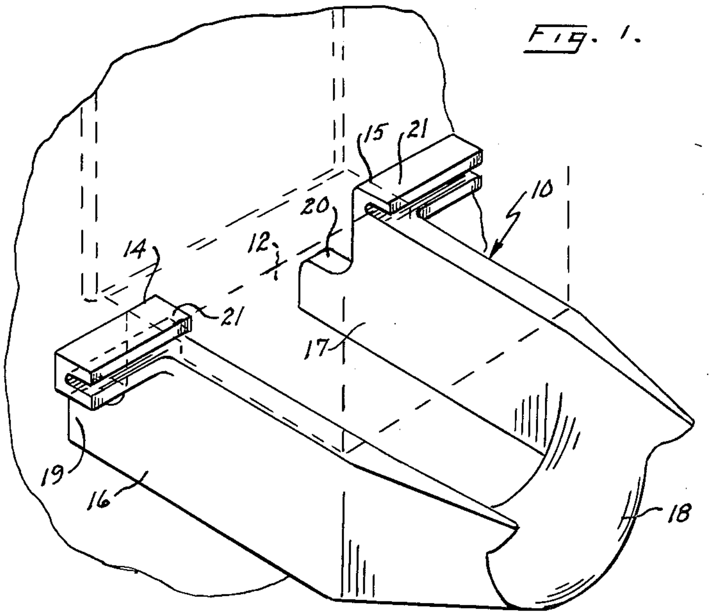
FIG. 1 illustrates in perspective a phone attachment that may be attached to a wall telephone box.

Referring to the drawings, and particularly FIG. 1, there is illustrated a telephone supporting attachment 10, which may be easily attached to the bottom panel of a telephone box (shown in dotted lines). The telephone box on each side is cut away and on its bottom surface is provided with an opening between the wall and the bottom panel 12. It is through this opening that the spaced ends 14 and 15 of the holder 10 may be passed without touching the sides to engage the panel 12, and due to their hook shaped design, will support the attachment 10 in a hanging relation below the telephone box. The attachment 10 is comprised of two parallel elements 16 and 17, that are joined at one end by a semicircular band 18, the opposite end being open, the opposite end of each of the parallel elements being similarly shaped, that is the upper portion of the end is provided with hook shaped hangers 14 and 15 and with protruding wall abutting portions 19 and 20. Thus it is apparent that in use the attachment 10 is mounted to the bottom of the telephone box by inserting the hook shaped portions 14 and 15 through an opening adjacent the wall in the bottom, so that the hook shaped portions pass over and lie on top of the lower panel 12. The wall abutting portions 19 and 20 will abut with the wall on which the telephone box is mounted, retaining the attachment in the position as illustrated in FIG. 1. The hook shaped portions 14 and 15 are provided with extended straight ends 21, which allow for a degree of adjustment after attachment has been mounted, that is the attachment may be pushed back to insure the abutting portions 19 and 20 meeting the wall and also moved right or left to center the holder, thus holding the attachment in juxtaposition with the bottom of the telephone box. It is also to be noted that the semicircular portion 18 of the attachment is actually shaped or formed with the exact contour of the portion of the phone that is to be mounted therein, so that in use, when the phone is mounted in portion 18, it will hang and be retained in a perfect fitting relation.

Figures 2, 3, 4:
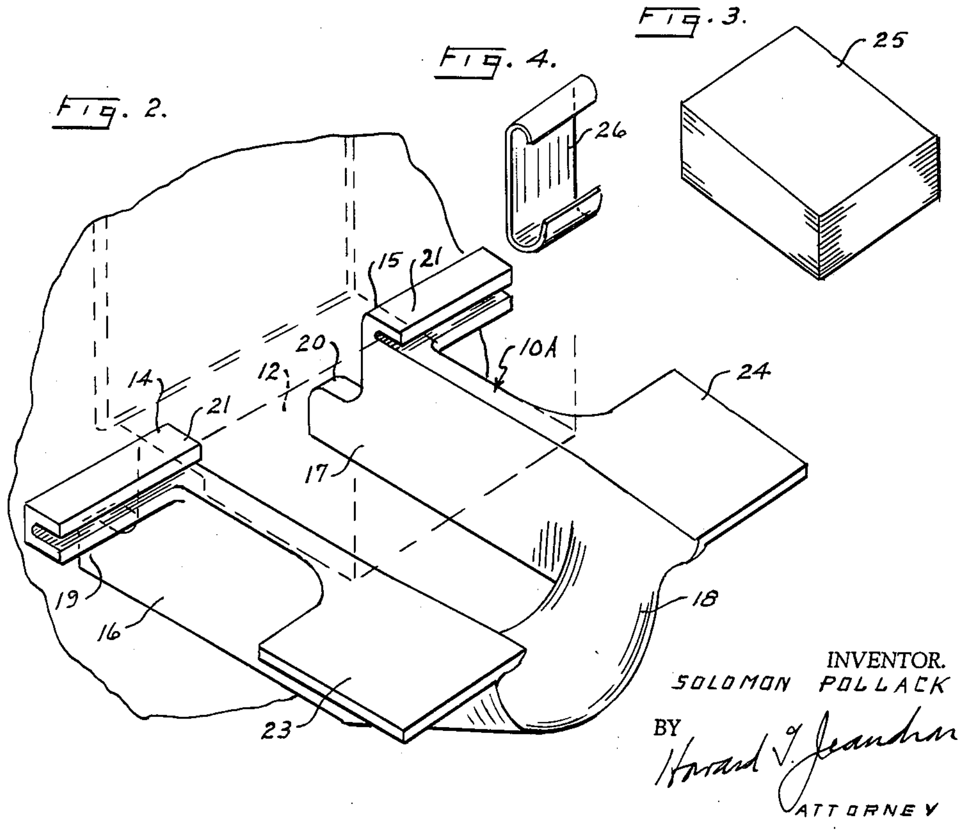
FIG. 2 illustrates a perspective view of a further embodiment of the phone attachment illustrated in FIG. 1.
FIG. 3 illustrates a pad of paper that may be mounted on the attachment shown in FIG. 2.
FIG. 4 illustrates the type of clamp that may be utilized to clamp the paper pad on its supporting portion of the attachment shown in FIG. 2.

Referring to FIG. 2, which illustrates a further embodiment of this invention, there is illustrated a similar telephone supporting attachment 10A, which is similar in every respect to the attachment 10 of FIG. 1, but in this embodiment the attachment is provided with additional facilities, namely a pair of supporting wings or planes 23 and 24, which are identical in form and which extend in opposed relation either side of the top surface of the attachment at either edge of the semicircular portion 18. The wing shaped planes 23 and 24 may be approximately square or rectangular in shape, as desired, and they may be moulded as a portion of the attachment 10 or they may be provided to be easily attached to the attachment 10. Also, the hook shaped portions 14 and 15 may extend outward on either side to parallel the edges of planes 23 and 24.

Referring to FIG. 3, there is illustrated a paper pad 25 which is of a proper proportion to be mounted on either of the planes 23 and 24, or duplicate paper pads may be mounted on each plane 23 and 24, or larger pads may be used and be supported on both the plane 23 and extension 14 on one side and plane 24 and extension 15 on the other side.

Referring to FIG. 4, there is illustrated a clamp 26, which is in the shape of a C. The clamp 26 may be constructed as a single metal band of a spring steel, so that clamp 26 may be easily bent to open, but upon release will spring back to the shape as illustrated in FIG. 4. This clamp 26 is thus utilized with the paper pad 25 to clamp pad 25 on the planes or supporting shelves 23, 24 or shelves 15, 24 or 14, 23 as desired. The extended ends of portions 14 and 15 may also be used for other purposes such as supporting a telephone book or books in a hanging relation below the telephone.

Various changes may be made to the design of the attachment 10, such as its size and shape and its supporting elements 18, 14, 15, 23 and 24, without departing from the spirit of this invention, as long as the attachment 10 is supported from the bottom of a telephone box and caused to abut with the wall or element supporting the wall telephone box, without departing from the spirit of this invention, and this invention shall be limited only by the appended claims.

What is claimed is:

1. A hand set supporting attachment for a wall telephone box having a base panel, comprising a one piece frame, said frame provided with two hook-shaped portions at one end of said frame and spaced apart in opposed relation, said attachment provided with two wall abutting portions at the same end of said frame and spaced from said hook-shaped portions to retain said hook-shaped portions engaged with the base panel of the wall telephone box, said attachment provided with a semicircular bend at the opposite end from said wall abutting portions to provide a fitting support for the end of the telephone.

2. A device according to claim 1, in which said attachment is also provided with a pair of identical supporting wings, which extend in opposed relation either side of the top surface of the holder at either edge of the semicircular portion.

3. A device according to claim 1, in which said attachment is also provided with a pair of identical supporting wings which extend in opposed relation either side of the top surface of the holder at either edge of the semicircular portion, and in which the hook shaped portions also extend outward on either side of said telephone box and in alignment with the said supporting wings to provide a base for a pad.

4. A device according to claim 1, in which said hook shaped portions extend outward on either side of said telephone box to provide supporting elements for hanging a telephone book.

References Cited in the file of this patent

UNITED STATES PATENTS 2,879,342 Bagley ---------------- Mar. 24, 1959